United States Patent
Hu et al.

(10) Patent No.: US 10,067,261 B2
(45) Date of Patent: Sep. 4, 2018

(54) DOWNHOLE PHOTON RADIATION DETECTION USING SCINTILLATING FIBERS

(71) Applicant: Halliburton Energy Services, Inc, Houston, TX (US)

(72) Inventors: Yike Hu, Houston, TX (US); Weijun Guo, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/129,131

(22) PCT Filed: Sep. 15, 2015

(86) PCT No.: PCT/US2015/050220
§ 371 (c)(1),
(2) Date: Sep. 26, 2016

(87) PCT Pub. No.: WO2017/048239
PCT Pub. Date: Mar. 23, 2017

(65) Prior Publication Data
US 2017/0261639 A1   Sep. 14, 2017

(51) Int. Cl.
*G01V 5/12* (2006.01)
*E21B 47/12* (2012.01)
*G01T 1/20* (2006.01)

(52) U.S. Cl.
CPC .............. *G01V 5/12* (2013.01); *E21B 47/123* (2013.01); *G01T 1/201* (2013.01)

(58) Field of Classification Search
CPC .......... G01V 5/12; E21B 47/123; G01T 1/201
See application file for complete search history.

(56) References Cited

U.S. PATENT DOCUMENTS

| | | | |
|---|---|---|---|
| 4,598,202 A | 7/1986 | Koechner | |
| 4,788,436 A * | 11/1988 | Koechner | ............... G01T 1/201 250/227.23 |
| 4,931,646 A | 6/1990 | Koechner | |
| 5,313,065 A | 5/1994 | Reed | |
| 5,424,546 A | 6/1995 | Okada et al. | |
| 5,675,151 A | 10/1997 | Oka et al. | |
| 5,880,475 A | 3/1999 | Oka et al. | |
| 6,703,622 B2 | 3/2004 | Joubert | |

(Continued)

FOREIGN PATENT DOCUMENTS

WO   WO 2013/122763 A1   8/2013
WO   WO 2014/089256 A1   6/2014

OTHER PUBLICATIONS

International Search Report and The Written Opinion of the International Search Authority, or the Declaration, dated May 25, 2016, PCT/US2015/050220, 16 pages, ISA/KR.

*Primary Examiner* — Hugh H Maupin
(74) *Attorney, Agent, or Firm* — Haynes and Boone, LLP

(57) ABSTRACT

A photon radiation detection systems utilizes scintillating fibers to detect downhole radioactivity along a wellbore. The system includes a light detection unit, extended light guide, and a scintillating fiber radiation detector extending along a wellbore. The scintillating fiber radiation detector may be a permanent part of the wellbore completion, or may be deployed via a downhole conveyance. The detected light photons may be utilized to evaluate the formation, cement layer or tubular string.

23 Claims, 6 Drawing Sheets

(56) References Cited

U.S. PATENT DOCUMENTS

| | | |
|---|---|---|
| 7,064,333 B2 | 6/2006 | Torii |
| 8,183,534 B2 | 5/2012 | Lacroix et al. |
| 8,258,483 B1 | 9/2012 | Boatner et al. |
| 8,384,017 B2 | 2/2013 | Botto |
| 2012/0075953 A1 | 3/2012 | Chace et al. |
| 2012/0267519 A1 | 10/2012 | Nikitin et al. |
| 2014/0138528 A1 | 5/2014 | Pope et al. |
| 2014/0263991 A1 | 9/2014 | Therriault-Proulx et al. |
| 2014/0264040 A1* | 9/2014 | Cahill .................. G01F 23/288 250/362 |
| 2014/0325828 A1 | 11/2014 | Stoller |
| 2015/0362600 A1* | 12/2015 | Perna .................. G01T 1/2006 250/361 R |

* cited by examiner

DOWNHOLE PHOTON RADIATION DETECTION USING SCINTILLATING FIBERS

PRIORITY

The present application is a U.S. National Stage patent application of International Patent Application No. PCT/US2015/050220, filed on Sep. 15, 2015, the benefit of which is claimed and the disclosure of which is incorporated herein by reference in its entirety.

FIELD OF THE DISCLOSURE

The present disclosure relates generally to downhole logging and, more specifically, to downhole photon radiation detection using scintillating fibers.

BACKGROUND

Nuclear density measurements rely on the attenuation of a radiation field of known intensity traversing a region of interest. Such an attenuation measurement technique requires the determination of the radiation field intensity before entering and after exiting the region of interest. In a downhole environment, density measurements are typically performed in a single cylindrical downhole tool.

In typical downhole gamma-gamma density measurements, the downhole tool contains both one or more photon detectors and a gamma radiation source of known intensity. The formation density of interest is probed when photons emitted from the radiation source exit the bore-hole region and scatter off the formation back into the bore-hole again, where they are detected by a detection unit on the downhole tool.

One of the disadvantages to such methods is that the downhole tool electronics are submitted to the harsh wellbore conditions, which requires more system maintenance. In addition, more deployment time and money are required because the tool must be repeatedly conveyed and retrieved from the wellbore to perform such maintenance.

DESCRIPTION OF ILLUSTRATIVE EMBODIMENTS

Illustrative embodiments and related methodologies of the present disclosure are described below as they might be employed in downhole photon radiation detection using scintillating fibers. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As described herein, illustrative embodiments of the present disclosure are directed to photon radiation detection systems and methods utilizing scintillating fibers. In a generalized embodiment, the system includes a light detection unit, extended light guide, and a scintillating fiber radiation detector extending along a wellbore. The scintillating fiber radiation detector may be a single scintillating fiber or an array of scintillating fibers. During operation, the scintillating fiber radiation detector converts the incident radiation to light photons. The scintillating fibers are optically coupled to an extended light guide, comprised of transparent optical fibers, which provides coupling between the scintillating fiber radiation detector and the light detection unit. The light detection unit may be placed on the surface, or in the borehole. The light detection unit can be a single detector or a position-sensitive detector.

In operation, the disclosed system does not depend on having the light detection unit and/or its electronics in the downhole environment, thereby avoiding the harsh downhole environment and its negative effects. The illustrative embodiments disclosed herein may be used for photon radioactivity detection in a passive or active manner. In passive detection mode, the system measures the radioactivity inside the formation or in the downhole environment. In active detection mode, the system may be paired with an external radiation source. The detected photon radiation may be used to perform a variety of wellbore operations, such as, for example, formation evaluation, cement evaluation, and tubular (e.g., casing) evaluation.

Figure 1:
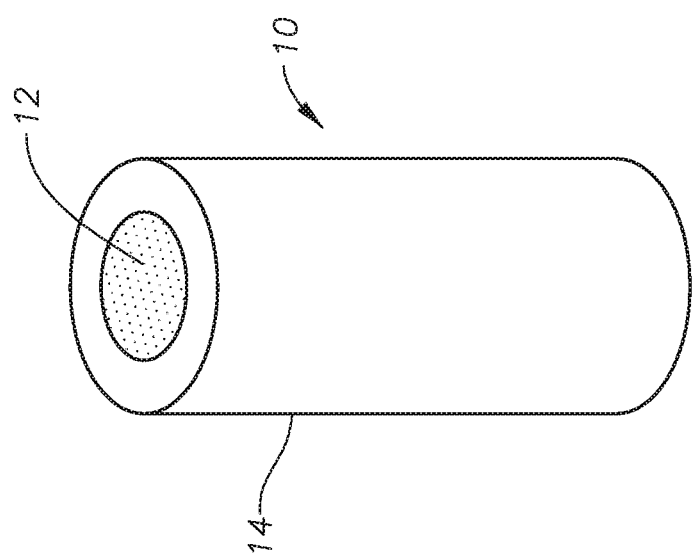
FIG. 1 is a cut-away schematic view of a single scintillating fiber utilized in the illustrative embodiments of the present disclosure.

FIG. 1 is a cut-away schematic view of a single scintillating fiber utilized in the illustrative embodiments of the present disclosure. As will be discussed in more detail below, the disclosed embodiments utilize an extended light guide (i.e., optical fibers) to optically couple a scintillating fiber radiation detector to a light detection unit. In certain embodiments, the scintillating fiber radiation detector may be permanently positioned downhole for the detection of photon radiation, such as natural gamma rays emitted from the formation. When such an embodiment is implemented, the scintillating fiber must be sufficiently protected.

Accordingly, in FIG. 1, a single scintillating fiber 10 is being utilized as the scintillating fiber radiation detector. Scintillating fiber 10 is comprised of a scintillating core 12, which is cladded with a protecting covering 14, such as, for example, a polymer having a lower refractive index than scintillating fiber core 12. As such, the photon radiation is able to travel through protective covering 14, where they are deposited into scintillating fiber core 12. Protecting covering 14 protects scintillating fiber core 12 against surface deterioration, which would otherwise lead to bad reflection at the light detection unit. Protecting covering 14 may also reduce the loss of scintillation light through the surface of scintillating fiber core 12. Scintillating fiber core 12 can be made of, for example, plastic fiber, glass fiber or scintillating liquid in capillaries. Plastic fiber, e.g. polystyrene (PS), as the core, has a good light photon yield, longer light attenuation, and shorter scintillating decay time.

Figure 2A:
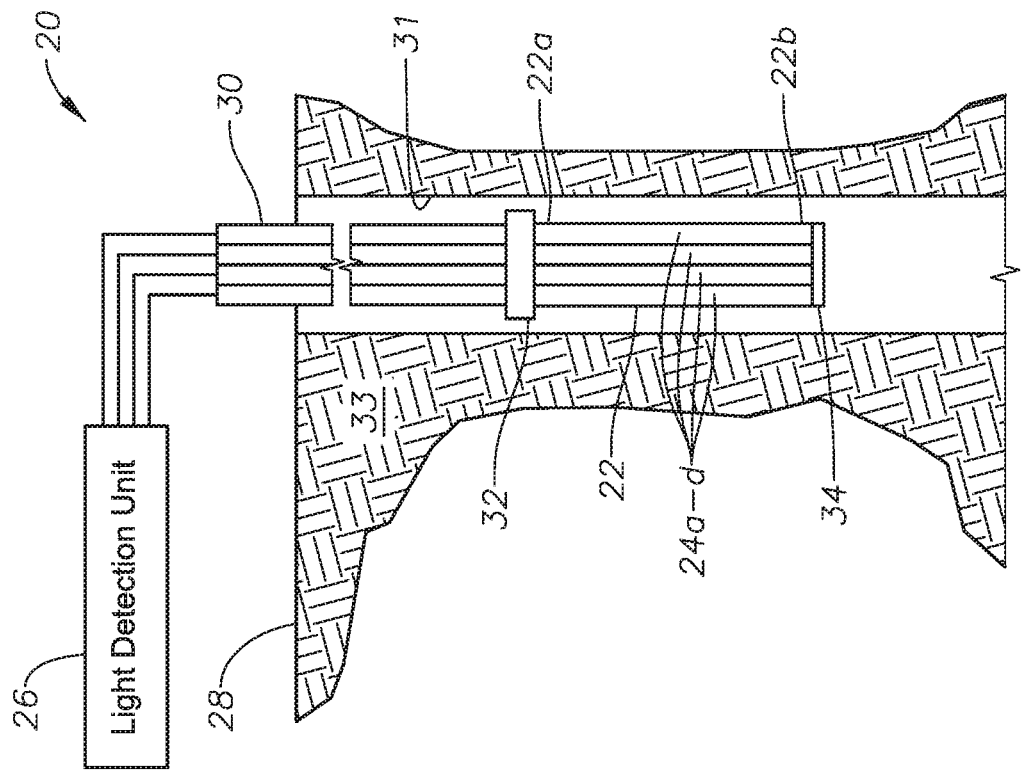
FIGS. 2A and 2B are schematic illustrations of photon radiation detection systems, according to alternative illustrative embodiments of the present disclosure.
Figure 2B:
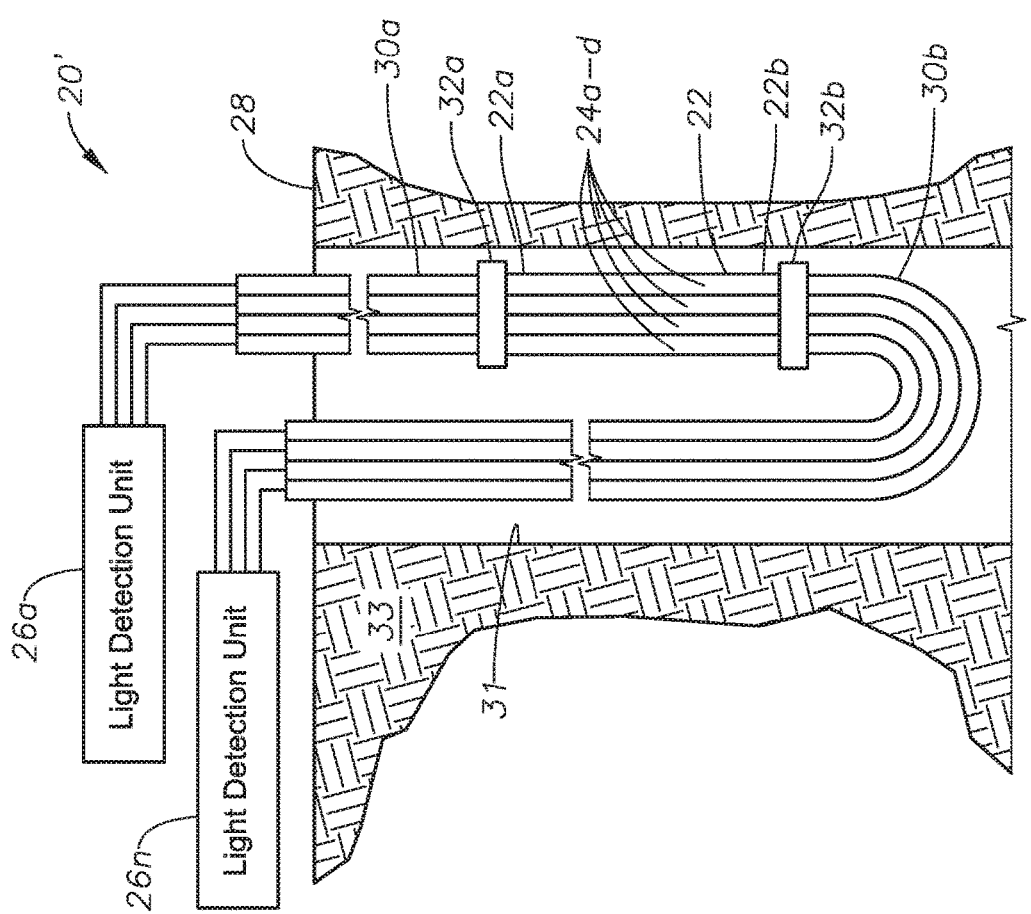

FIGS. 2A and 2B are schematic illustrations of photon radiation detection systems, according to alternative illustrative embodiments of the present disclosure. As previously described, the scintillating fiber radiation detector may be comprised of a single fiber or an array of fibers. In the illustrated embodiments, however, scintillating fiber detection system 20 includes scintillating fiber radiation detector 22 that is comprised of an array of scintillating fibers 24a-d. In FIG. 2A, scintillating fiber detection system 20 includes a light detection unit 26 positioned at a surface location 28. In other embodiments, however, light detection unit 26 may be positioned downhole. Light detection unit 26 is part of the signal processing chain. To obtain higher detection efficiency, light detection unit 26 has absorption characteristics which peak around the scintillation light wavelength, where the wavelength is dependent upon the dopants added in the scintillating fiber. In particular, light detection unit 26 may be, for example, a charge coupled detector (CCD), p-i-n photon diode, or another solid-state detector that optimizes the measurement.

In certain embodiments described herein, the light detection units are configured for positional sensitivity. In certain embodiments, this may be achieved by coupling a single light detection unit to a single scintillating fiber, while in other embodiments a single light detection unit may be coupled to an array of scintillating fibers, whereby the detected light photons are mapped to their respective scintillating fibers.

The light detection units described herein may include at least one processor, a non-transitory, computer-readable storage, transceiver/network communication module, optional I/O devices, and an optional display (e.g., user interface), all interconnected via a system bus. The network communication module may be any type of communication interface such as a fiber optic interface and may communicate using a number of different communication protocols. Software instructions executable by the processor for implementing the radioactivity mapping described herein may be stored in suitable storage or some other computer-readable medium.

Moreover, those skilled in the art will appreciate that the disclosure may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Nevertheless, light detection unit 26 is optically coupled to an extended light guide 30, which may be transparent optical fibers that extend over a desired range without significant reduction in light intensity. Extended light guide 30 extends down a wellbore 31 which has been drilled in a formation 33. Extended light guide 30 is connected to an optical coupler 32 capable of combining or splitting transmission data from optical fibers, as understood in the art. Optical coupler 32 provides coupling between extended light guide 30 and scintillating fiber radiation detector 22 (coupling to a first end 22a of scintillating fiber radiation detector 22). As such, in certain illustrative embodiments, optical coupler 32 is comprised of the same number of fibers as scintillating fiber radiation detector 22. Alternatively, however, to achieve N−1 mapping from scintillating fiber radiation detector 22, optical coupler 32 may combine multiple signals from the scintillating fibers. An optical mirror 34 is coupled to the second opposite end 22b of scintillating fiber radiation detector 22. In this embodiment, optical mirror 34 was fabricated by polishing second end 22b, then adding a coat of reflective material; however, other suitable optical mirrors may be utilized.

FIG. 2B is similar to FIG. 2A in a number of ways. However, in photon radiation detection system 20', scintillating fiber radiation detector 22 is coupled to extended light guides at both ends 22a and 22b. As shown, light detection guide 26a is optically coupled to scintillating fiber radiation detector 22 via extended light guide 30a and optical coupler 32a, as previously described. In addition, scintillating fiber radiation detector 22 (at second end 22b) is coupled to a second light detection unit 26n via second extended light guide 30b and second optical coupler 32b.

During operation of the embodiments in FIGS. 2A and 2B, photon radiation is emitted from the wellbore. In certain embodiments, the photon radiation (i.e., gamma ray) is naturally emitted from formation 33, while in other embodiments, a separate downhole radiation source generates the radiation. In the latter embodiment, the generated radiation will first interact with the formation, casing, cement, etc., then interact with scintillating fiber radiation detector 22. Nevertheless, in FIG. 2A, the emitted photon radiation propagates toward scintillating fiber radiation detector 22, whereby it interacts therewith to produce light photon within the fiber(s) of scintillating fiber radiation detector 22. Dependent upon the angle at with the radiation interacts with the fiber(s), the resulting light photons may travel uphole through optical coupler 32 and extended light guide 30, where they are detected and processed by light detection unit 26. Alternatively, the photon radiation may interact with the fiber(s) at an angle whereby the resulting light photons first travel toward optical mirror 34, and are then reflected back to light detection unit 26 as previously described. Since only one light detection unit 26 is used in photon radiation detection system 20, only the total amount of light generated during the downhole interaction is measured.

During the operation of photon radiation detection system 20' of FIG. 2B, after the emitted photon radiation interacts with scintillating fiber radiation detector 22, the resulting light photons may travel along the fiber(s) in both directions whereby they are detected by light detection units 26a or 26n. Depending upon the interaction angle, some of the light photons travel through optical coupler 32a and extended light guide 30a, and on to light detection unit 26a, while other light photons will travel through second optical coupler 32B and second extended light guide 30b, and on to second light detection unit 26n. Having two or more light detection units and extended light guides adds measurement diversity because they provide more information about the incident photon energy and angle, which can be used to derive the origin of photon interaction.

In either embodiment of FIGS. 2A and 2B, the light photons detected at light detection unit(s) 26 are converted to electrical signals and further processed to perform a number of wellbore operations. For example, the density of formation 33 may be evaluated by determining the total count rates measured at the light photon detector. In other embodiments, the integrity of the cement layer may be determined by the spectra shape measured at the light photon detector. In yet other embodiments, the casing string may also be evaluated by measuring the spectra from the attenuation of natural radioactivity from the formation.

FIGS. 3A-3E are schematic illustrations of scintillating fiber combinations, according to alternative embodiments of the present disclosure. In certain embodiments, the photon radiation detection systems described herein are positionally sensitive to photon radiation. To achieve this functionality, the individual scintillating fibers may be doped uniformly or distributively with scintillating dopants which allow the detection of different radiation characteristics along the wellbore. In other words, the dopants change the gamma ray sensitivity and allow the efficient detection of gamma ray of different energy. Such dopants may include, for example, an aromatic scintillator, such as PMP (1-phenyl-3-mesityl-2-pyrazoline) or 3HF (3-hydroxyflavone). For example, 3HF doped scintillating fiber emits photon which peak at 530 nm, which is favorable for the photon transmission in the extended light guide. Different segments of the same or different scintillating fibers may be doped with the same or different dopants.

Figure 3A:
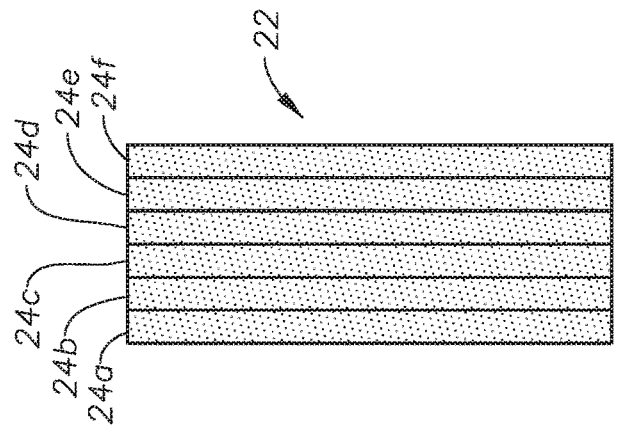
FIGS. 3A-3E are schematic illustrations of scintillating fiber combinations, according to alternative embodiments of the present disclosure.
Figure 3B:
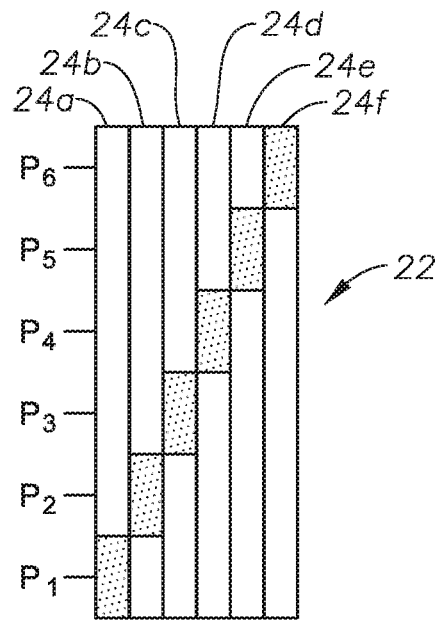

With reference to FIGS. 3A-3B, the scintillating fiber arrays of scintillating fiber radiation detectors 22 can be a combination of any of the doped configurations. In FIG. 3A, scintillating fiber radiation detector 22 includes six scintillating fibers 24a-f, all of which are uniformly doped using a similar dopant. In such an embodiment, each scintillating fiber 24a-f may be optically coupled to the same or different light detection units. In FIG. 3B, different segments of scintillating fibers 24a-f are doped using similar dopants (referred to as "doping zones"), thereby providing vertical positional sensitivity along the true depth of the wellbore. As shown, fiber 24a is doped to provide sensitivity at vertical depth $P_1$, fiber 24b at depth $P_2$, fiber 24c at depth $P_3$, and so on. In the embodiment of FIG. 3B, each scintillating fiber 24a-f may be optically coupled to a separate light detection unit to thereby enable positional photon radiation detection.

Figure 3C:
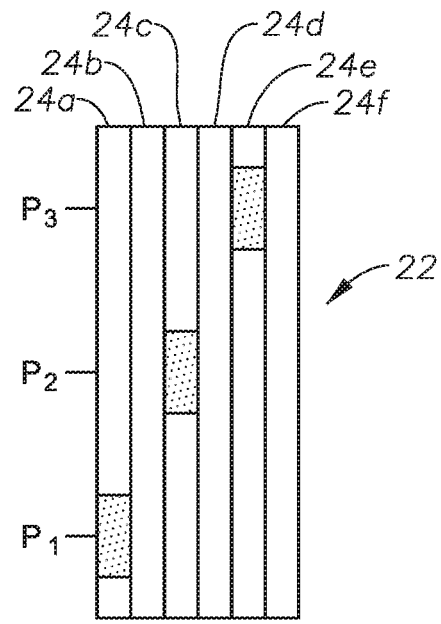
Figure 3D:
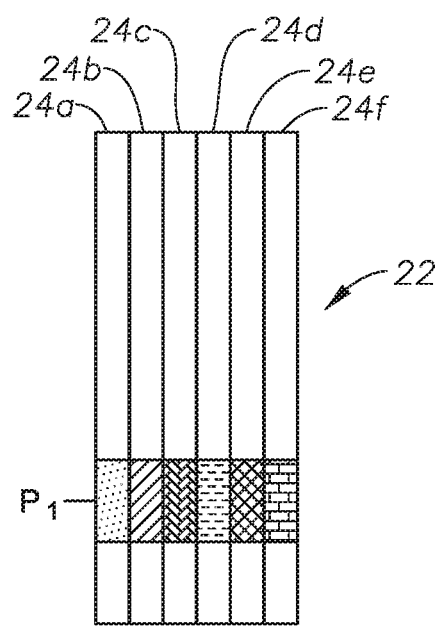
Figure 3E:
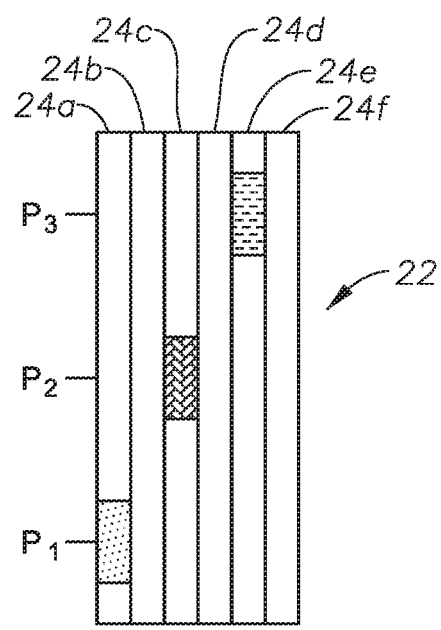

FIG. 3C illustrates yet another configuration whereby only scintillating fibers 24a, c, and e are doped with similar dopants at vertical depths $P_1$, $P_2$ and $P_3$. Note that the doping zones along scintillating fibers 24a, c and e do not have to be adjacent one another, as scintillating fibers 24b, d and f may or may not be doped also. In FIG. 3D, each scintillating fiber 24a-f has been doped with a different scintillator dopants at similar segments, thus providing no positional sensitivity. However, given the differing dopants, each scintillating fiber 24a-f will detect a different photon radiation characteristic along the wellbore at the same vertical depth position $P_1$. Different radiation characteristics may include, for example, gamma ray energy levels. In FIG. 3E, scintillating fibers 24a, b, and e have been doped with different scintillator dopants at different segments, thus providing the capability to detect different photon radiation characteristics at different positions $P_1$, $P_2$ and $P_3$ along the wellbore. The foregoing are illustrative in nature only, as any of the embodiments may be combined as desired.

During operation of the scintillating fiber radiation detectors 22 of FIGS. 3A-3C, photon radiation interacts with scintillating fibers 24a-f, as previously described. Using the embodiment of FIG. 3B, for example, the amount of light photons generated within scintillating fibers 24a-f will be detected by the light detection unit(s) optically coupled to the fibers. Once detected, the light detection unit(s) will map the amount of light photons in each fiber 24a-c to their respective depth positions $P_1$-$P_6$ to thereby determine the amount of radioactivity at different locations along the wellbore. When there is radioactivity at a certain depth, the radioactivity will interact with the dopant zone in a particular scintillating fiber. Therefore, the corresponding light detection unit coupled to that scintillating fiber will record a signal from such radiation interaction. It therefore gives data on the depth of radioactivity. The spacing of dopant zones along the scintillating fibers is determined by the target depth resolution required by a particular tool design. During operation of the embodiment of FIG. 3D, for example, the light detection unit(s) will map the photon radiation characteristic(s) at depth position $P_1$. In the embodiment of FIG. 3E, the light detection unit(s) will map the photon radiation characteristic detected in fibers 24a, c and e to their respective depths $P_1$-$P_3$.

Although described herein as "vertical" depth positions, note that the depth position doesn't necessarily have to be at a different depth, as the embodiments of the present disclosure are equally applicable to deviated wellbores.

Figure 4A:
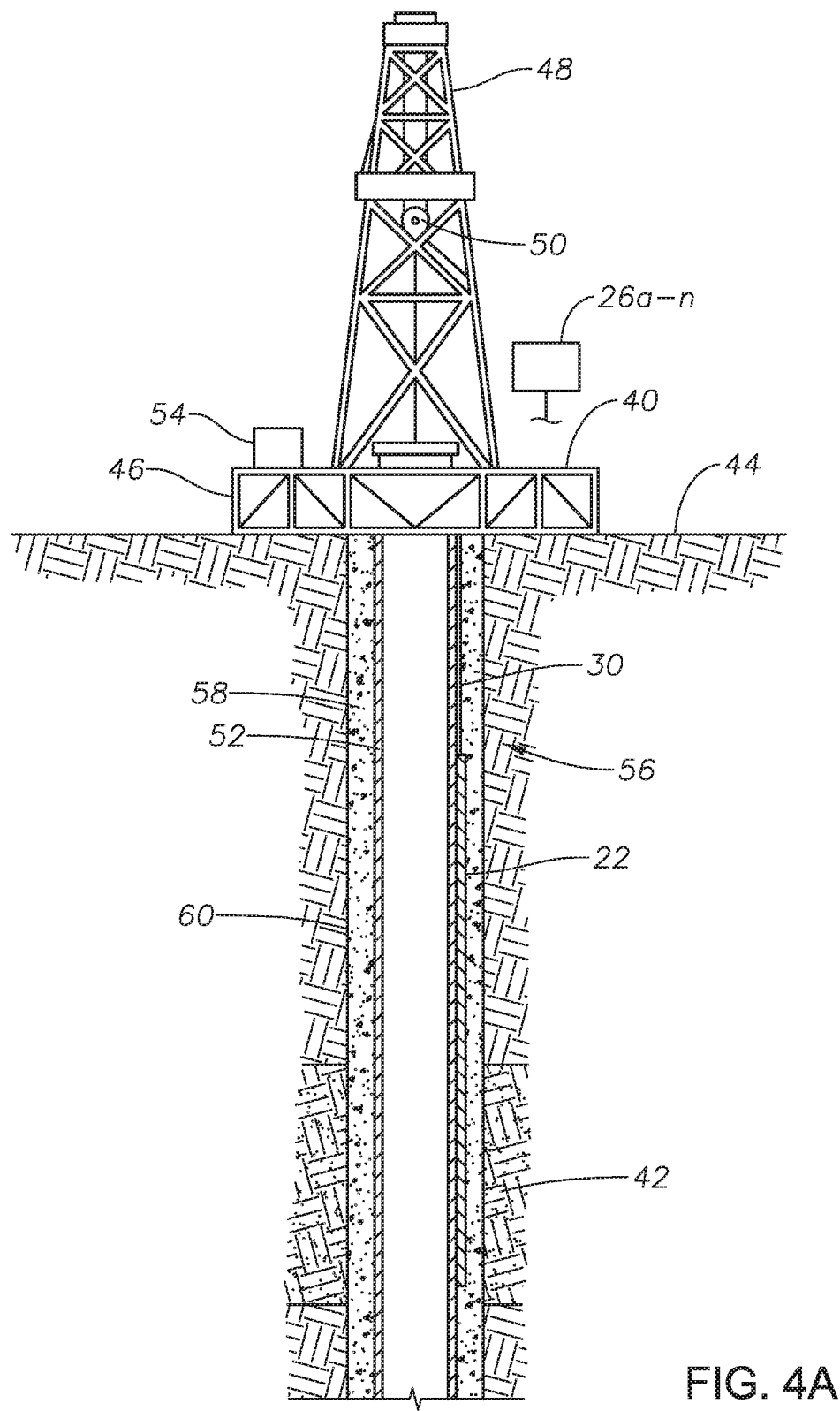
FIG. 4A is a schematic illustration of an onshore oil or gas drilling rig in which the scintillating fiber radiation detector has been permanently positioned along the wellbore, according to certain illustrative embodiments of the present disclosure.

FIG. 4A is a schematic illustration of an onshore oil or gas drilling rig in which the scintillating fiber radiation detector has been permanently positioned along the wellbore, according to certain illustrative embodiments of the present disclosure. Rig 40 is centered over a subterranean oil or gas formation 42 located below the earth's surface 44. Rig 40 includes a work deck 46 that supports derrick 48. Derrick 48 supports a hoisting apparatus 50 for raising and lowering pipe strings such as casing 52. Pump 54 is capable of pumping a variety of wellbore compositions (e.g., drilling fluid or cement) into the well and includes a pressure measurement device that provides a pressure reading at the pump discharge.

Wellbore 56 has been drilled through the various earth strata, including formation 42. Upon completion of wellbore drilling, casing 52 is placed in wellbore 56 to facilitate the production of oil and gas from formation 42. Casing 52 is a string of pipes that extends down wellbore 56, through which oil and gas will eventually be extracted. The region between casing 52 and the wall of wellbore 56 is known as the casing annulus 58. In this illustrative embodiment, a photon radiation detection system is utilized wherein one or more light detection unit(s) 26a-n are positioned at surface 44, while scintillating fiber radiation detector 22 and extended light guide 30 (along with all necessary couplings, electronics, etc.) have been permanently positioned downhole within annulus 58. In certain embodiments, scintillating fiber radiation detector 22 and extended light guide 30 may form part of casing 52. In other embodiments, they may be embedded within cement 60 used to cement casing 52 in place. In yet other embodiments, they may be positioned inside casing 52 or may form part of an inner string, such as, for example, part of a production string. There are a variety of other ways in which these components may be permanently positioned downhole, as these are only illustrative in nature. Moreover, any of the embodiments of the photon radiation detection systems described herein may be utilized in the illustrated application in FIG. 4A.

During operations of the embodiment of FIG. 4A, photon radiation in the form of gamma rays is naturally emitted from formation 42. Therefore, scintillating fiber radiation detector 22 passively detects this radiation, which is then converted to light photons. The light photons are then optically communicated via extended light guide 30 to light detection unit(s) 26a-n. Dependent upon the specific embodiment(s) utilized, the detected light photons are used to determine the amount and/or characteristic of radioactivity along one or more positions along wellbore 56. This data is then utilized to perform any of the wellbore operations described herein.

Figure 4B:
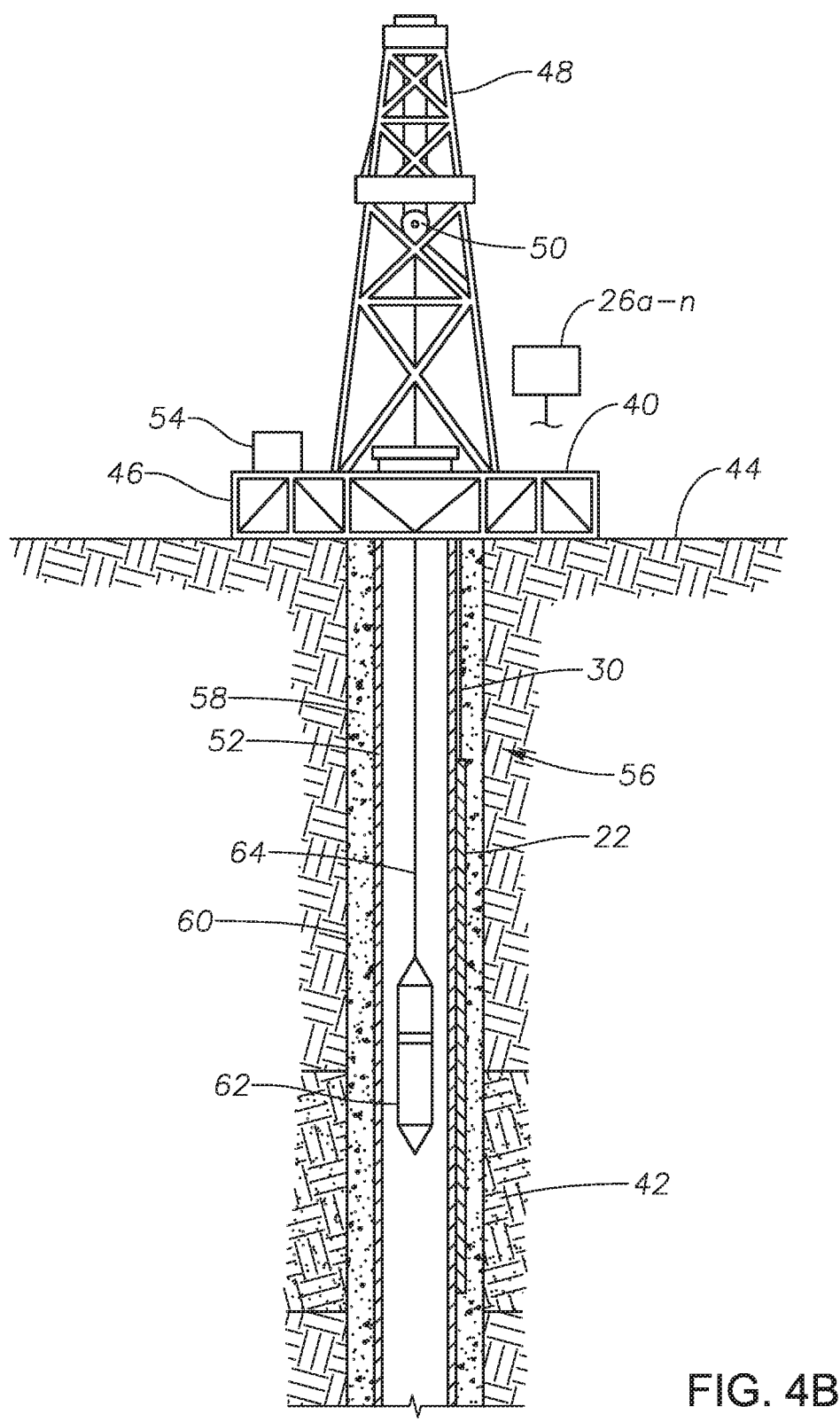
FIG. 4B is a schematic illustration substantially identical to FIG. 4A, in which a separate photon radiation source is deployed along a wireline, according to certain illustrative embodiments of the present disclosure.

FIG. 4B is a schematic illustration identical to FIG. 4A, in which a separate photon radiation source is deployed along a wireline, according to certain illustrative embodiments of the present disclosure. After scintillating fiber radiation detector 22 and extended light guide 30 have been permanently positioned downhole, this embodiment allows for active detection of photon radioactivity. Here, a logging tool 62 (having a radiation source thereon) may be run into wellbore 56 following completion of cementing a segment of casing, for example, as part of a wireline 64 or other conveyance (e.g., logging-while-drilling or measurement-while-drilling assembly, or some other suitable downhole string). As it is conveyed up or down wellbore 56, photon radiation is emitted and interacts with the surrounding casing, cement layer, and/or formation. After this interaction, the photon radiation then interacts with scintillating fiber radiation detector 22, whereby the light photons are detected as previously described. Ultimately, the position of radioactivity along wellbore 56 are logged and utilized as desired.

In yet other illustrative embodiments of the present disclosure, the photon radiation source may be permanently positioned downhole as part of the wellbore casing, for example, as tracer radioactivity materials used in fracturing and perforation.

Figure 4C:
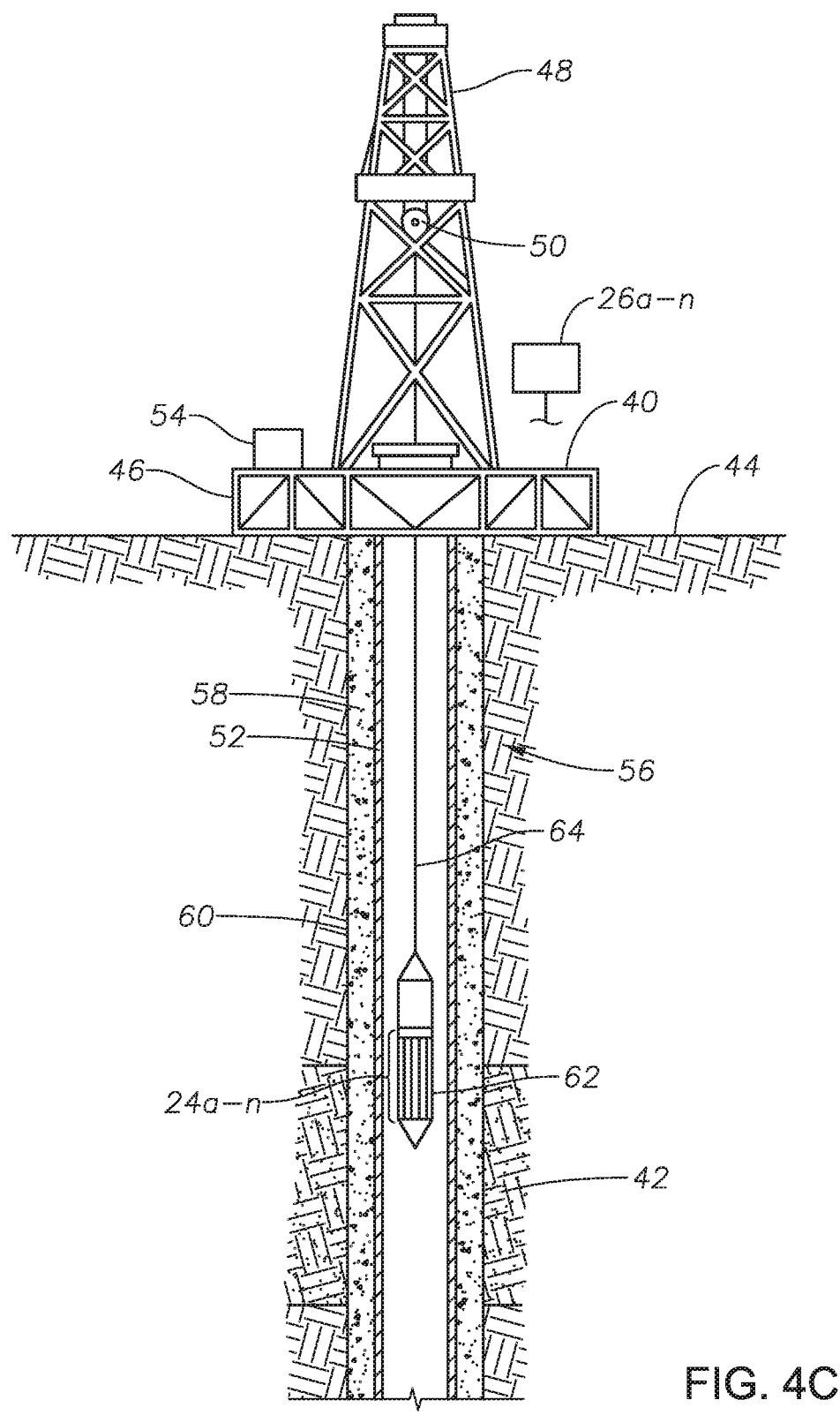
FIG. 4C illustrates yet another embodiment of the present disclosure whereby the scintillating fiber radiation detector is deployed along a wireline.

FIG. 4C illustrates yet another embodiment of the present disclosure whereby the scintillating fiber radiation detector 22 is deployed along a wireline. The embodiment of FIG. 4C is the same as that of FIG. 4B, however the scintillating fiber radiation detector 22 and extended light guide 30 are not permanently positioned along wellbore 56. Instead, scintillating fiber radiation detector 22 (having fibers 24a-n therein) is deployed via wireline 64 (extended light guide 30 forms part of wireline 64. Thus, during operation, scintillating fiber radiation detector 22 is deployed along wellbore 56 whereby it passively detects photon radiation being emitted from formation 42, then produces light photons which are communicated to light detection unit(s) 26a-n.

Although not shown in FIG. 4C, scintillating fiber radiation detector 22 may also be equipped with an onboard radiation source for active detection. In such an embodiment, suitable shielding is necessary between the radiation source and fibers 24a-n. Such shielding may be, for example, tungsten or lead. Moreover, fibers 24a-n may be doped as previously described in order to detect different radiation characteristics along wellbore 56. In alternative embodiments, the active detection system of FIG. 4C may be deployed using a slickline, coiled tubing, production string or other downhole string or conveyance.

Accordingly, the foregoing embodiments provide many advantages. The disclosed photon detection systems do not require downhole placement of the light detection unit and its sensitive electronics in the hash downhole environment. By positioning only the scintillating fiber radiation detector downhole, electronic maintenance is minimized. The scintillating fiber(s) can also be made into an array and connected to positionally sensitive light detection unit(s), which provides position sensitive spectrometric information. The system can be used as a deployed tool or a permanent sensor in active and passive modes. Moreover, the scintillating fiber array with different dopants inside each fiber can provide fine vertical resolution in gamma ray measurements.

Embodiments described herein further relate to any one or more of the following paragraphs:

1. A downhole photon radiation detection system, comprising a light detection unit positioned at a surface location; and a scintillating fiber radiation detector optically coupled to the light detection unit, the scintillating fiber radiation detector extending along a wellbore drilled in a formation.

2. A system as defined in paragraph 1, wherein the scintillating fiber radiation detector is permanently positioned along the wellbore.

3. A system as defined in paragraphs 1 or 2, wherein the scintillating fiber radiation detector forms part of a casing string extending along the wellbore; or is cemented between the casing string and formation.

4. A system as defined in any of paragraphs 1-3, wherein the scintillating fiber radiation detector forms part of a wireline, slickline, production string or coiled tubing assembly.

5. A system as defined in any of paragraphs 1-4, wherein the scintillating fiber radiation detector is a single scintillating fiber.

6. A system as defined in any of paragraphs 1-5, wherein the scintillating fiber radiation detector comprises an array of scintillating fibers.

7. A system as defined in any of paragraphs 1-6, wherein the scintillating fibers in the array are sensitive at different positions along the wellbore.

8. A system as defined in any of paragraphs 1-7, wherein the scintillating fibers in the array are doped with different scintillator dopants.

9. A system as defined in any of any of paragraphs 1-8, further comprising an extended light guide optically coupled between the light detection unit and the scintillating fiber radiation detector.

10. A system as defined in any of paragraphs 1-9, further comprising an optical coupler that couples the light guide and the scintillating fiber radiation detector, the optical coupler being connected to a first end of the scintillating fiber radiation detector; and an optical mirror connected to a second end of the scintillating fiber radiation detector, the second end being opposite the first end.

11. A system as defined in any of paragraphs 1-10, further comprising a first optical coupler that couples the light guide and the scintillating fiber radiation detector, the first optical coupler being connected to a first end of the scintillating fiber radiation detector; a second optical coupler that couples the second end of the scintillating fiber radiation detector to a second extended light guide; and a second light detection unit optically coupled to the scintillating fiber radiation detector via the second optical coupler, the second light radiation detector unit being positioned at the surface location.

12. A system as defined in any of paragraphs 1-11, wherein a source of radiation is the formation; a radiation source deployed along a downhole string; or a radiation source which forms a permanent part of the wellbore.

13. A downhole photon radiation detection method, comprising interacting photon radiation with a scintillating fiber radiation detector positioned along a wellbore; converting the radiation to light photons; detecting the light photons using a light detection unit positioned at a surface location; and utilizing the detected light photons to perform a wellbore operation.

14. A method as defined in paragraph 13, wherein the radiation is generated by a radiation source positioned along a downhole string; a radiation source forming part of the wellbore; or a formation in which the wellbore is positioned.

15. A method as defined in paragraphs 13 or 14, wherein the wellbore operation comprises an evaluation of a formation, cement layer or casing string.

16. A method as defined in any of paragraphs 13-15, wherein the wellbore operation is determining a position of radioactivity along the wellbore.

17. A method as defined in any of paragraphs 13-16, wherein the scintillating fiber radiation detector has been permanently positioned in the wellbore.

18. A method as defined in any of paragraphs 13-17, wherein the scintillating fiber radiation detector is deployed using a wireline, slickline or coiled tubing.

19. A downhole photon radiation detection method, comprising performing a well logging operation using a scintillating fiber radiation detector positioned along a wellbore.

20. A method as defined in paragraph 19, wherein the scintillating fiber radiation detector is permanently positioned downhole.

21. A method as defined in paragraph 19 or 20, wherein the scintillating fiber radiation detector forms part of a wireline, slickline or coiled tubing string positioned downhole.

22. A method as defined in any of paragraphs 19-21, further comprising logging a position of radioactivity along the wellbore.

23. A method as defined in any of paragraphs 19-22, further comprising detecting different radiation characteristics along the wellbore.

Although various embodiments and methodologies have been shown and described, the disclosure is not limited to such embodiments and methodologies and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A downhole photon radiation detection system, comprising:
   a light detection unit positioned at a surface location;
   a scintillating fiber radiation detector extending along a wellbore drilled in a formation; and
   an extended light guide extending along the wellbore to optically couple the light detection unit to the scintillating fiber radiation detector.

2. A system as defined in claim 1, wherein the scintillating fiber radiation detector is permanently positioned along the wellbore.

3. A system as defined in claim 2, wherein the scintillating fiber radiation detector:
   forms part of a casing string extending along the wellbore; or
   is cemented between the casing string and formation.

4. A system as defined in claim 1, wherein the scintillating fiber radiation detector forms part of a wireline, slickline, production string or coiled tubing assembly.

5. A system as defined in claim 1, wherein the scintillating fiber radiation detector is a single scintillating fiber.

6. A system as defined in claim 1, wherein the scintillating fiber radiation detector comprises an array of scintillating fibers.

7. A system as defined in claim 6, wherein the scintillating fibers in the array are sensitive at different positions along the wellbore.

8. A system as defined in claim 6, wherein the scintillating fibers in the array are doped with different scintillator dopants.

9. A system as defined in claim 1, wherein the light detection unit measures scintillation light and has absorption characteristics that peak at about a scintillation light wavelength and wherein the light detection unit includes at least one processor.

10. A system as defined in claim 1, further comprising:
    an optical coupler that couples the extended light guide and the scintillating fiber radiation detector, the optical coupler being connected to a first end of the scintillating fiber radiation detector; and
    an optical mirror connected to a second end of the scintillating fiber radiation detector, the second end being opposite the first end.

11. A system as defined in claim 1, further comprising:
    a first optical coupler that couples the extended light guide and the scintillating fiber radiation detector, the first optical coupler being connected to a first end of the scintillating fiber radiation detector;
    a second optical coupler that couples the second end of the scintillating fiber radiation detector to a second extended light guide; and
    a second light detection unit optically coupled to the scintillating fiber radiation detector via the second optical coupler, the second light radiation detector unit being positioned at the surface location.

12. A system as defined in claim 1, wherein a source of radiation is:
    the formation;
    a radiation source deployed along a downhole string; or
    a radiation source which forms a permanent part of the wellbore.

13. A downhole photon radiation detection method, comprising:
    interacting photon radiation with a scintillating fiber radiation detector positioned along a wellbore;
    converting the radiation to light photons;
    conveying the light photons from the scintillating fiber radiation detector to a light detection unit positioned at a surface location using an extended light guide that optically couples the scintillating fiber radiation detector and the light detection unit; and
    detecting the light photons using the light detection unit;
    utilizing the detected light photons to perform a wellbore operation.

14. A method as defined in claim 13, wherein the radiation is generated by:
    a radiation source positioned along a downhole string;
    a radiation source forming part of the wellbore; or
    a formation in which the wellbore is positioned.

15. A method as defined in claim 13, wherein the wellbore operation comprises an evaluation of a formation, cement layer or casing string.

16. A method as defined in claim 13, wherein the wellbore operation is determining a position of radioactivity along the wellbore.

17. A method as defined in claim 13, wherein the scintillating fiber radiation detector has been permanently positioned in the wellbore.

18. A method as defined in claim 13, wherein the scintillating fiber radiation detector is deployed using a wireline, slickline or coiled tubing.

19. A downhole photon radiation detection method, comprising:

conveying light photons emitted by a scintillating fiber radiation detector that extends along a wellbore to a light detection unit positioned at a surface location using an extended light guide that optically couples the scintillating fiber radiation detector to the light detection unit;

converting the light photons detected at the light detection unit into electrical signals; and performing a well logging operation based on processing of the electrical signals.

20. A method as defined in claim 19, wherein the scintillating fiber radiation detector is permanently positioned downhole.

21. A method as defined in claim 19, wherein the scintillating fiber radiation detector forms part of a wireline, slickline or coiled tubing string positioned downhole.

22. A method as defined in claim 19, further comprising logging a position of radioactivity along the wellbore.

23. A method as defined in claim 19, further comprising detecting different radiation characteristics along the wellbore.

* * * * *